United States Patent
Yan

(10) Patent No.: US 11,137,855 B2
(45) Date of Patent: Oct. 5, 2021

(54) TOUCH PANEL AND TOUCH DISPLAY PANEL

(71) Applicant: WUHAN CHINA STAR OPTOELECTRONICS SEMICONDUCTOR DISPLAY TECHNOLOGY CO., LTD., Wuhan (CN)

(72) Inventor: Weinan Yan, Wuhan (CN)

( * ) Notice: Subject to any disclaimer, the term of this patent is extended or adjusted under 35 U.S.C. 154(b) by 320 days.

(21) Appl. No.: 16/334,367

(22) PCT Filed: Nov. 1, 2018

(86) PCT No.: PCT/CN2018/113407
§ 371 (c)(1),
(2) Date: Mar. 19, 2019

(87) PCT Pub. No.: WO2020/015249
PCT Pub. Date: Jan. 23, 2020

(65) Prior Publication Data
US 2021/0181914 A1   Jun. 17, 2021

(30) Foreign Application Priority Data
Jul. 19, 2018 (CN) .......................... 201810796867.0

(51) Int. Cl.
*G06F 3/041* (2006.01)
*G06F 3/044* (2006.01)

(52) U.S. Cl.
CPC ........ *G06F 3/04164* (2019.05); *G06F 3/0446* (2019.05)

(58) Field of Classification Search
CPC .......................... G06F 3/0446; G06F 3/04164
USPC .......................................................... 345/174
See application file for complete search history.

(56) References Cited

U.S. PATENT DOCUMENTS

2011/0273398 A1* 11/2011 Ho ........................ G06F 3/0443
                                                                    345/174
2013/0181943 A1*  7/2013 Bulea .................... G06F 3/0448
                                                                    345/174
2013/0277193 A1  10/2013 Kyu-Tak
(Continued)

FOREIGN PATENT DOCUMENTS

CN   203588242 U   5/2014
CN   205210854 U   5/2016
CN   104156133 B   4/2017

*Primary Examiner* — Mark Edwards

(57) ABSTRACT

A touch panel includes a substrate, a plurality of capacitive sensor units, an emitting signal line, N first receiving signal lines, and M second receiving signal lines. Each of the capacitive sensor units includes a vertical sensing capacitor and a horizontal sensing capacitor disposed adjacent to each other. The emitting signal line is connected to one terminal of each of the vertical sensing capacitors and one terminal of each of the horizontal sensing capacitors. The N first receiving signal lines, are respectively connected to another terminals of the vertical sensing capacitors of the capacitive sensor units in the N columns. The M second receiving signal lines are respectively connected to another terminals of the horizontal sensing capacitors of the capacitive sensor units in the M rows, the horizontal sensing capacitors in a same row corresponding to one second receiving signal line.

18 Claims, 2 Drawing Sheets

(56) References Cited

U.S. PATENT DOCUMENTS

2013/0307795 A1\* 11/2013 Suarez Rovere ....... G06F 3/042
345/173
2017/0168602 A1\* 6/2017 Ye ....................... G06F 3/04166
2017/0235393 A1\* 8/2017 Son ....................... G06F 3/0443
345/174

\* cited by examiner

TOUCH PANEL AND TOUCH DISPLAY PANEL

BACKGROUND

1. Field of the Invention

The present application relates to the field of liquid crystal, more particularly, to a touch panel and a touch display panel.

2. Description of the Related Art

At present, smart display devices are almost inseparable from touch devices. With the development and demand of the market, an increasing number of touch types have emerged. Currently, the most widely used touch technology is capacitive touch, which has the advantages of high transmittance, flexible operation, multi-touch, and long life. Capacitive touch is mainly classified into two types: self-capacitive type and mutual-capacitive type. The self-capacitive touch is low cost and has a simple working mode but poor anti-noise ability. It is easy for multi-touch to generate ghost points. The mutual-capacitive type has strong anti-noise ability and precise multitouch. However, it has the disadvantages of high power consumption and complicated working timing, etc.

Therefore, there is a need to resolve the above problems of the related art.

SUMMARY

An objective of the present application is to provide a touch panel and a touch display panel that have anti-noise ability and precise multitouch.

The present application provides a touch panel. The touch panel comprises:
a substrate;
a plurality of capacitive sensor units, the plurality of capacitive sensor units being disposed on the substrate and distributed in an array of M rows and N columns, each of the capacitive sensor units comprising a vertical sensing capacitor and a horizontal sensing capacitor disposed adjacent to each other;
an emitting signal line, the emitting signal line being connected to one terminal of each of the vertical sensing capacitors and one terminal of each of the horizontal sensing capacitors;
N first receiving signal lines, the N first receiving signal lines being respectively connected to another terminals of the vertical sensing capacitors of the capacitive sensor units in the N columns, the vertical sensing capacitors in a same column corresponding to one first receiving signal line; and
M second receiving signal lines, the M second receiving signal lines being respectively connected to another terminals of the horizontal sensing capacitors of the capacitive sensor units in the M rows, the horizontal sensing capacitors in a same row corresponding to one second receiving signal line;
wherein the touch panel further comprises a touch sensor chip, the touch sensor chip has N first receiving pins and M second receiving pins, the N first receiving pins are connected to the N first receiving signal lines correspondingly, the M second receiving pins are connected to the M second receiving signal lines correspondingly;
the vertical sensing capacitor comprises a first receiving electrode and a first emitting electrode, the first receiving electrode is connected to the first receiving signal line correspondingly, the first emitting electrode is connected to the emitting signal line.

In the touch panel according to the present application, the horizontal sensing capacitor comprises a second receiving electrode and a second emitting electrode. The second receiving electrode is connected to the second receiving signal line correspondingly. The second emitting electrode is connected to the emitting signal line.

In the touch panel according to the present application, the first receiving signal line monitors capacitance changes of the vertical sensing capacitors of a corresponding column, the second receiving signal line monitors capacitance changes of the horizontal sensing capacitors of a corresponding row, and a capacitance variation of each of the horizontal sensing capacitors and the vertical sensing capacitors is calculated and obtained based on the inversion reconstruction algorithm.

In the touch panel according to the present application, capacitance values of the plurality of vertical sensing capacitors are equal, capacitance values of the plurality of horizontal sensing capacitors are equal.

In the touch panel according to the present application, the capacitive sensor unit comprises an emitting electrode, the first receiving electrode, and a second receiving electrode, the emitting electrode comprises a first emitting metal segment and a second emitting metal segment connected to each other and having a predetermined angle, the first receiving electrode is in parallel with and faces the first emitting metal segment to constitute the vertical sensing capacitor, the second receiving electrode is in parallel with and faces the second emitting metal segment to constitute the horizontal sensing capacitor.

In the touch panel according to the present application, the first emitting metal segment and the second emitting metal segment are vertically connected.

In the touch panel according to the present application, the first emitting metal segment and the second emitting metal segment are connected at an angle of 45 degrees.

The present application also provides a touch panel. The touch panel comprises:
a substrate;
a plurality of capacitive sensor units, the plurality of capacitive sensor units being disposed on the substrate and distributed in an array of M rows and N columns, each of the capacitive sensor units comprising a vertical sensing capacitor and a horizontal sensing capacitor disposed adjacent to each other;
an emitting signal line, the emitting signal line being connected to one terminal of each of the vertical sensing capacitors and one terminal of each of the horizontal sensing capacitors;
N first receiving signal lines, the N first receiving signal lines being respectively connected to another terminals of the vertical sensing capacitors of the capacitive sensor units in the N columns, the vertical sensing capacitors in a same column corresponding to one first receiving signal line; and
M second receiving signal lines, the M second receiving signal lines being respectively connected to another terminals of the horizontal sensing capacitors of the capacitive sensor units in the M rows, the horizontal sensing capacitors in a same row corresponding to one second receiving signal line.

In the touch panel according to the present application, the touch panel further comprises a touch sensor chip, the touch sensor chip has N first receiving pins and M second receiving pins, the N first receiving pins are connected to the N first receiving signal lines correspondingly, the M second receiving pins are connected to the M second receiving signal lines correspondingly.

In the touch panel according to the present application, the vertical sensing capacitor comprises a first receiving electrode and a first emitting electrode, the first receiving electrode is connected to the first receiving signal line correspondingly, the first emitting electrode is connected to the emitting signal line.

In the touch panel according to the present application, the horizontal sensing capacitor comprises a second receiving electrode and a second emitting electrode, the second receiving electrode is connected to the second receiving signal line correspondingly, the second emitting electrode is connected to the emitting signal line.

In the touch panel according to the present application, the first receiving signal line monitors capacitance changes of the vertical sensing capacitors of a corresponding column, the second receiving signal line monitors capacitance changes of the horizontal sensing capacitors of a corresponding row, and a capacitance variation of each of the horizontal sensing capacitors and the vertical sensing capacitors is calculated and obtained based on the inversion reconstruction algorithm.

In the touch panel according to the present application, capacitance values of the plurality of vertical sensing capacitors are equal, capacitance values of the plurality of horizontal sensing capacitors are equal.

In the touch panel according to the present application, the capacitive sensor unit comprises an emitting electrode, the first receiving electrode, and a second receiving electrode, the emitting electrode comprises a first emitting metal segment and a second emitting metal segment connected to each other and having a predetermined angle, the first receiving electrode is in parallel with and faces the first emitting metal segment to constitute the vertical sensing capacitor, the second receiving electrode is in parallel with and faces the second emitting metal segment to constitute the horizontal sensing capacitor.

In the touch panel according to the present application, the first emitting metal segment and the second emitting metal segment are vertically connected.

In the touch panel according to the present application, the first emitting metal segment and the second emitting metal segment are connected at an angle of 45 degrees.

The present application further provides a touch display panel. The touch display panel includes a display panel and a touch panel disposed on the display panel. The touch panel comprises:

a substrate;

a plurality of capacitive sensor units, the plurality of capacitive sensor units being disposed on the substrate and distributed in an array of M rows and N columns, each of the capacitive sensor units comprising a vertical sensing capacitor and a horizontal sensing capacitor disposed adjacent to each other;

an emitting signal line, the emitting signal line being connected to one terminal of each of the vertical sensing capacitors and one terminal of each of the horizontal sensing capacitors;

N first receiving signal lines, the N first receiving signal lines being respectively connected to another terminals of the vertical sensing capacitors of the capacitive sensor units in the N columns, the vertical sensing capacitors in a same column corresponding to one first receiving signal line; and M second receiving signal lines, the M second receiving signal lines being respectively connected to another terminals of the horizontal sensing capacitors of the capacitive sensor units in the M rows, the horizontal sensing capacitors in a same row corresponding to one second receiving signal line.

In the touch panel according to the present application, the touch panel further comprises a touch sensor chip, the touch sensor chip has N first receiving pins and M second receiving pins, the N first receiving pins are connected to the N first receiving signal lines correspondingly, the M second receiving pins are connected to the M second receiving signal lines correspondingly.

In the touch panel according to the present application, the vertical sensing capacitor comprises a first receiving electrode and a first emitting electrode, the first receiving electrode is connected to the first receiving signal line correspondingly, the first emitting electrode is connected to the emitting signal line.

In the touch panel according to the present application, wherein the horizontal sensing capacitor comprises a second receiving electrode and a second emitting electrode, the second receiving electrode is connected to the second receiving signal line correspondingly, the second emitting electrode is connected to the emitting signal line.

The touch panel and touch display panel according to the present application have strong anti-noise ability and precise multitouch.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
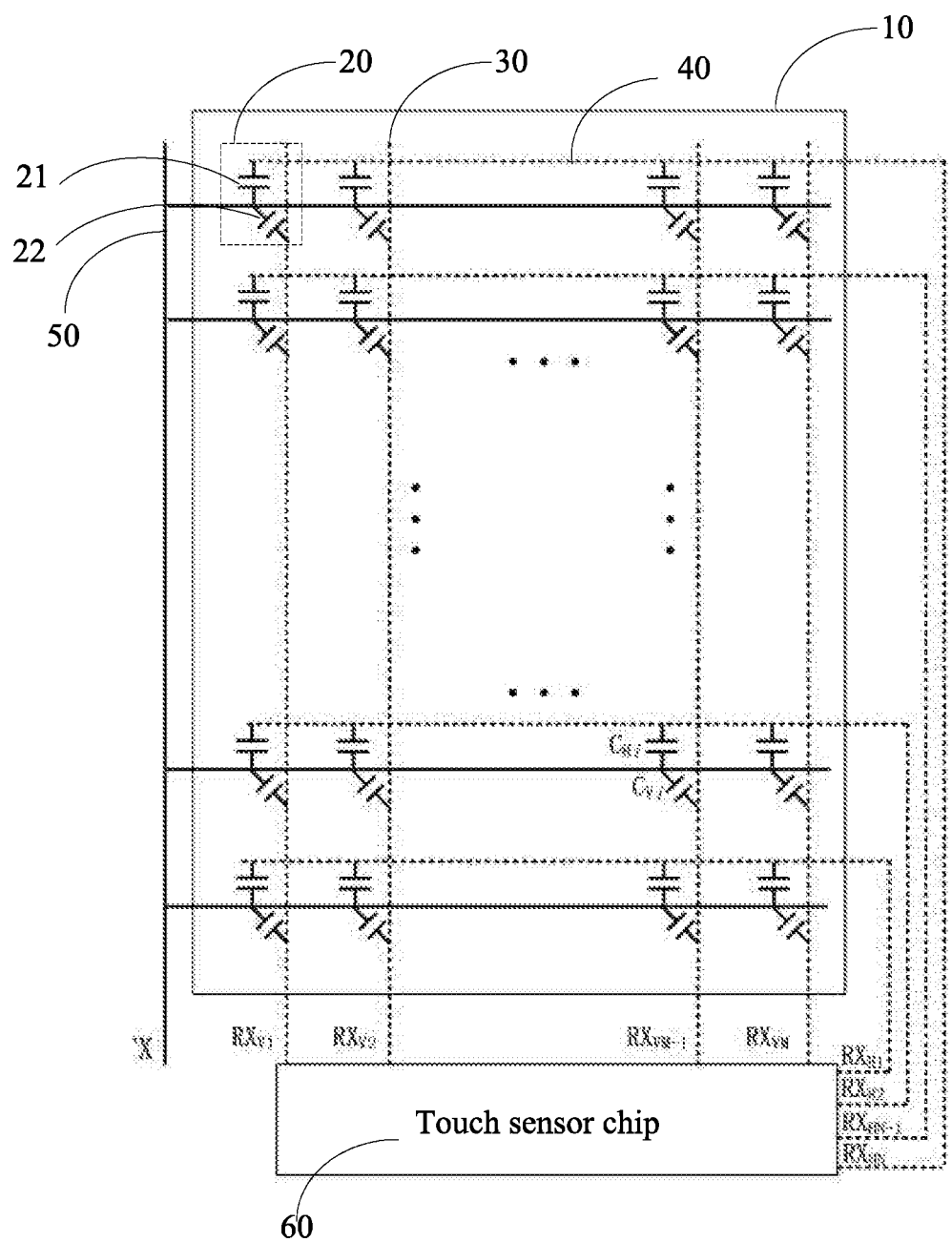
FIG. 1 is a structural schematic diagram of a touch panel according to one embodiment of the present application.

For the purpose of description rather than limitation, the following provides such specific details as a specific system structure, interface, and technology for a thorough understanding of the application. However, it is understandable by persons skilled in the art that the application can also be implemented in other embodiments not providing such specific details. In other cases, details of a well-known apparatus, circuit and method are omitted to avoid hindering the description of the application by unnecessary details.

In the disclosure, it is should be understood that spatially relative terms, such as "center", "longitudinal", "lateral", "length", "width", "above", "below", "front", "back", "left", "right", "horizontal", "vertical", "top", "bottom", "inner", "outer", "clockwise", "counterclockwise", "axial", "radial", "circumferential", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. The spatially relative terms are not limited to specific orientations depicted in the figures. In addition, the term "first", "second" are for illustrative purposes only and are not to be construed as indicating or imposing a relative importance or implicitly indicating the number of technical features indicated. Thus, a feature that limited by "first", "second" may expressly or implicitly include at least one of the features. In the description of the present disclosure, the meaning of "plural" is two or more, unless otherwise specifically defined.

All of the terminologies containing one or more technical or scientific terminologies have the same meanings that persons skilled in the art understand ordinarily unless they are not defined otherwise. For example, "arrange," "couple," and "connect," should be understood generally in the embodiments of the present disclosure. For example, "firmly connect," "detachably connect," and "integrally connect" are all possible. It is also possible that "mechanically connect," "electrically connect," and "mutually communicate" are used. It is also possible that "directly couple," "indirectly couple via a medium," and "two components mutually interact" are used.

In the present disclosure, unless definite regulation and limitation, a first feature "above" or "under" a second feature may include direct contact of the first and second features. A first feature "above" or "under" a second feature may also include first feature contacting the second feature via other features between the first and second features rather than contact directly. Moreover, the first feature "above," "over," or "on" the second feature means that the first feature is over or above the second feature or that the level of the first feature is merely higher than the level of the second feature. The first feature "below," "under," or "beneath" the second feature means that the first feature is under or below the second feature or that the level of the first feature is merely lower than the level of the second feature.

In the description of this specification, the description of the terms "one embodiment", "some embodiments", "examples", "specific examples", or "some examples", and the like, means to refer to the specific feature, structure, material or characteristic described in connection with the embodiments or examples being included in at least one embodiment or example of the present disclosure. In the present specification, the term of the above schematic representation is not necessary for the same embodiment or example. Furthermore, the specific feature, structure, material, or characteristic described may be in combination in a suitable manner in any one or more of the embodiments or examples. In addition, it will be apparent to those skilled in the art that different embodiments or examples described in this specification, as well as features of different embodiments or examples, may be combined without contradictory circumstances.

A description is provided with reference to FIG. 1. FIG. 1 is a structural schematic diagram of a touch panel according to one embodiment of the present application. The touch panel comprises a substrate 10, a plurality of capacitive sensor units 20, N first receiving signal lines 30, M second receiving signal lines 40, an emitting signal line 50, and a touch sensor chip 60.

The plurality of capacitive sensor units 20 are disposed on the substrate 10 and are distributed in an array of M rows and N columns. Each of the capacitive sensor units 20 comprises a vertical sensing capacitor 22 and a horizontal sensing capacitor 21 disposed adjacent to each other. The emitting signal line 50 is connected to one terminal of each of the vertical sensing capacitors 22 and one terminal of each of the horizontal sensing capacitors 21.

The vertical sensing capacitor 22 comprises a first receiving electrode and a first emitting electrode. The first receiving electrode is connected to the first receiving signal line 30 correspondingly. The first emitting electrode is connected to the emitting signal line 50. The horizontal sensing capacitor 21 comprises a second receiving electrode and a second emitting electrode. The second receiving electrode is connected to the second receiving signal line 40 correspondingly. The second emitting electrode is connected to the emitting signal line 50.

The N first receiving signal lines 30 are respectively connected another terminals of the vertical sensing capacitors 22 of the capacitive sensor units 20 in the N columns. The vertical sensing capacitors 22 in a same column correspond to one first receiving signal line 30.

The M second receiving signal lines 40 are respectively connected another terminals of the horizontal sensing capacitors 21 of the capacitive sensor units 20 in the M rows. The horizontal sensing capacitors 21 in a same row correspond to one second receiving signal line 40.

The touch sensor chip 60 has N first receiving pins and M second receiving pins. The N first receiving pins are connected to the N first receiving signal lines 30 correspondingly. The M second receiving pins are connected to the M second receiving signal lines 40 correspondingly.

The first receiving signal line 30 monitors capacitance changes of the vertical sensing capacitors 22 of a corresponding column. The second receiving signal line 40 monitors capacitance changes of the horizontal sensing capacitors 21 of a corresponding row. In addition, a capacitance variation of each of the horizontal sensing capacitors 21 and the vertical sensing capacitors 22 is calculated and obtained based on the inversion reconstruction algorithm to determine positions of finger touches.

The change in capacitance generated on each of the horizontal sensing capacitors 21 and the vertical sensing capacitors 22 is C1_1. Therefore, the relationships between the capacitance variations and the received signal may be shown in formula (1):

$$\begin{cases} C_{1\_1} + C_{1\_2} + \ldots + C_{1\_M} = RX_{H1} \\ \quad \ldots \\ C_{N\_1} + C_{N\_2} + \ldots + C_{N\_M} = RX_{HN} \\ C_{1\_1} + C_{2\_1} + \ldots + C_{N\_1} = RX_{V1} \\ \quad \ldots \\ C_{1\_M} + C_{2\_M} + \ldots + C_{N\_M} = RX_{VM} \end{cases} \quad (1)$$

Formula (1) is simplified as K·C=RX (2), where $$K = \begin{bmatrix} \overbrace{1,1,\ldots 1,1}^{M} & \ldots & 0 \\ & 1,1,\ldots 1,1 & \\ & & \ddots \\ & & & 1,1,\ldots 1,1 \\ & & & & \ddots \\ & & & & & 1,1,\ldots 1,1 \\ 0 & \ldots & & & & 1,1,\ldots 1,1 \\ 1,0,\ldots 0,0, & 1,0,\ldots 0,0, & 1,0,\ldots 0,0, & \ldots 0,0, & 1,0,\ldots 0,0 \\ 0,1,0,\ldots 0,0, & 1,0,\ldots 0,0, & 1,0,\ldots 0,0, & \ldots 0,1,0,\ldots 0 \\ \ddots & \ddots & \ddots & & \ddots \\ 0,\ldots 0,0,1, & 0,0,\ldots 0,1,0,0, & \ldots 0,1,\ldots 0,0, & \cdots 0,1 \end{bmatrix}$$

$$C = \begin{bmatrix} C_{1\_1} \\ \dots \\ C_{1\_M} \\ C_{2\_1} \\ \dots \\ C_{2\_M} \\ \dots \\ C_{N\_1} \\ \dots \\ C_{N\_M} \end{bmatrix} \quad RX = \begin{bmatrix} RX_{H1} \\ \dots \\ RX_{HN} \\ RX_{V1} \\ \dots \\ RX_{VM} \end{bmatrix}$$

It can be seen that formula (1) is an (M+N)×(M×N) undermined system of equations, the exact mathematical solution does not exist, or the solution is not unique. Therefore, a physically reasonable optimal solution can be achieved by fast convergence. According to the iterative correction rules, it can be divided into: algebraic reconstruction techniques (ART), multiplicative algebraic reconstruction techniques (MART), and simultaneous iterative reconstruction techniques (SART), etc. The present application mainly uses the ART algorithm to solve formula (1) and obtain:

$$C_j^{(i)} = C_j^{(i-1)} + \frac{\left(RX_i - \sum_{p=1}^{MN} C_p^{(i-1)} K_{ip}\right)}{\sum_{p=1}^{MN} K_{ip}^2} K_{ij} \quad h = 1, 2, \dots MN \quad (3)$$

where i represents the ith iteration. Usually, when the ART algorithm is used, only a limited number of iterations can be used, so the convergence criteria must be chosen to decide when to stop iteration. The commonly used iteration criterion is:
take $$U^{(i)} = \sum_{i=1}^{M+N} \left(RX_i - \overline{C^{(i)}} \cdot \overline{K_i}\right)^2,$$

when $$\sqrt{\frac{U^{(i)}}{MN}} < e (0 < e < 1)$$

then stop iteration. Through the algorithm, the capacitance variation of each of the capacitors can be effectively obtained, thus determining the touch positions.

In the present embodiment, capacitance values of the plurality of vertical sensing capacitors 22 are equal, or errors are avoided as much as possible to achieve equality. Capacitance values of the plurality of horizontal sensing capacitors 21 are equal, or errors are reduced as much as possible to achieve equality.

Figure 2:
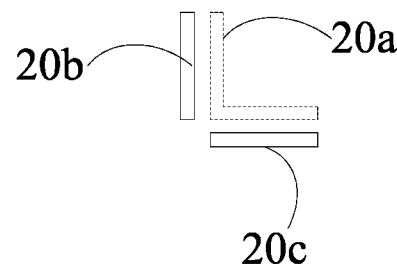
FIG. 2 is a structural diagram of a capacitive sensor unit of a touch panel according to one embodiment of the present application.

A description is provided with reference to FIG. 2. In some embodiments, the capacitive sensor unit 20 comprises an emitting electrode 20a, a first receiving electrode 20b, and a second receiving electrode 20c. The emitting electrode 20a comprises a first emitting metal segment and a second emitting metal segment connected to each other and having a predetermined angle. The first receiving electrode 20b is in parallel with and faces the first emitting metal segment to constitute the vertical sensing capacitor 22. The second receiving electrode 20c is in parallel with and faces the second emitting metal segment to constitute the horizontal sensing capacitor 21.

In some embodiments, the first emitting metal segment and the second emitting metal segment are vertically connected.

In some embodiments, the first emitting metal segment and the second emitting metal segment are connected at an angle of 45 degrees.

Figure 3:
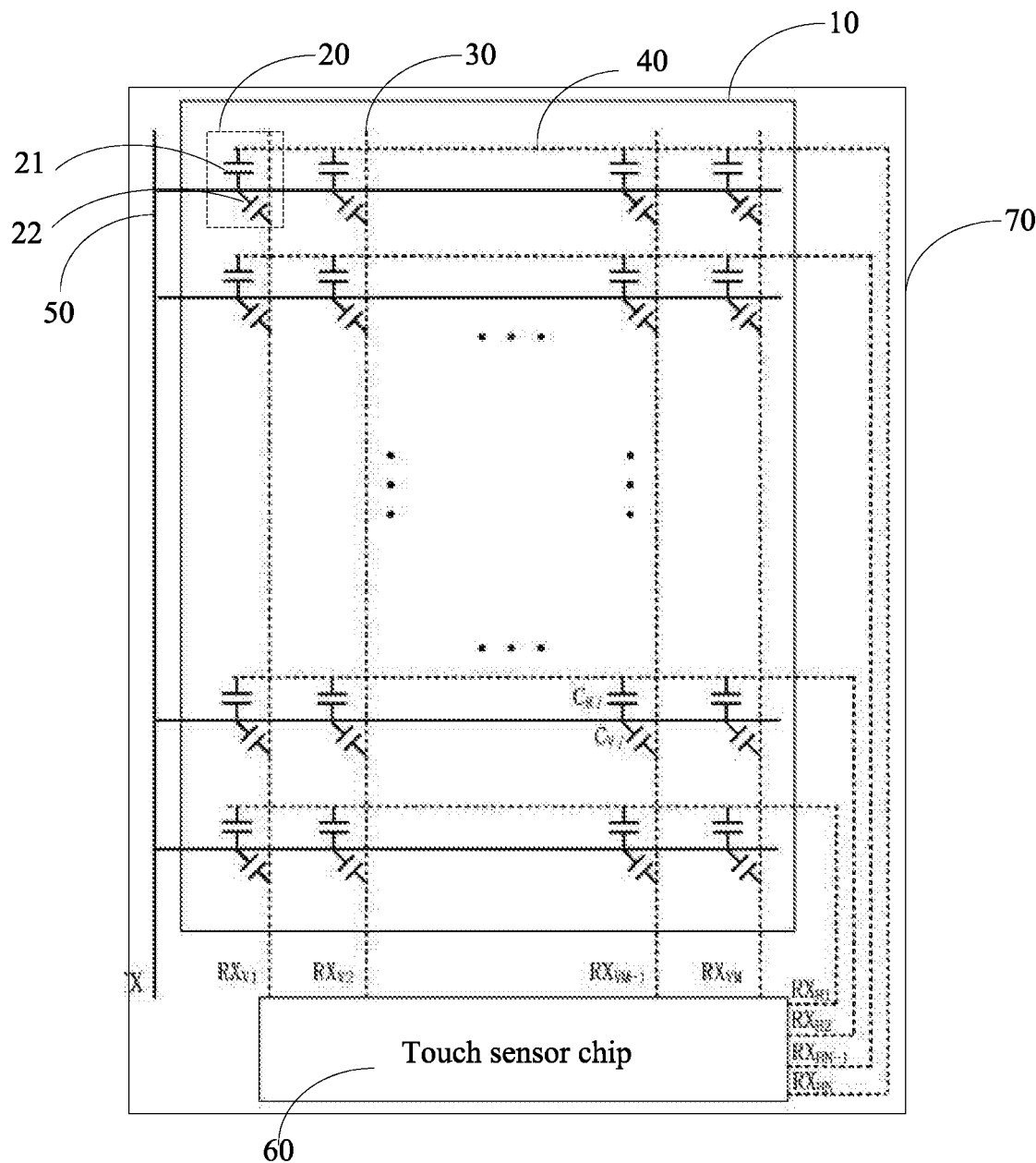
FIG. 3 is a structural schematic diagram of a touch display panel according to one embodiment of the present application.

A description is provided with reference to FIG. 3. FIG. 3 is a structural schematic diagram of a touch display panel according to one embodiment of the present application. The touch display panel comprises a display panel 70 and a touch panel. The touch panel comprises the substrate 10, the plurality of capacitive sensor units 20, the N first receiving signal lines 30, the M second receiving signal lines 40, the emitting signal line 50, and the touch sensor chip 60.

The plurality of capacitive sensor units 20 are disposed on the substrate 10 and are distributed in the array of M rows and N columns. Each of the capacitive sensor units 20 comprises the vertical sensing capacitor 22 and the horizontal sensing capacitor 21 disposed adjacent to each other. The emitting signal line 50 is connected to the one terminal of each of the vertical sensing capacitors 22 and the one terminal of each of the horizontal sensing capacitors 21.

The vertical sensing capacitor 22 comprises the first receiving electrode and the first emitting electrode. The first receiving electrode is connected to the first receiving signal line 30 correspondingly. The first emitting electrode is connected to the emitting signal line 50. The horizontal sensing capacitor 21 comprises the second receiving electrode and the second emitting electrode. The second receiving electrode is connected to the second receiving signal line 40 correspondingly. The second emitting electrode is connected to the emitting signal line 50.

The N first receiving signal lines 30 are respectively connected the another terminals of the vertical sensing capacitors 22 of the capacitive sensor units 20 in the N columns. The vertical sensing capacitors 22 in the same column correspond to the one first receiving signal line 30.

The M second receiving signal lines 40 are respectively connected the another terminals of the horizontal sensing capacitors 21 of the capacitive sensor units 20 in the M rows. The horizontal sensing capacitors 21 in the same row correspond to the one second receiving signal line 40.

The touch sensor chip 60 has the N first receiving pins and the M second receiving pins. The N first receiving pins are connected to the N first receiving signal lines 30 correspondingly. The M second receiving pins are connected to the M second receiving signal lines 40 correspondingly.

The first receiving signal line 30 monitors capacitance changes of the vertical sensing capacitors 22 of the corresponding column. The second receiving signal line 40 monitors capacitance changes of the horizontal sensing capacitors 21 of the corresponding row. In addition, a capacitance variation of each of the horizontal sensing capacitors 21 and the vertical sensing capacitors 22 is calculated and obtained based on the inversion reconstruction algorithm to determine positions of finger touches.

In the present embodiment, capacitance values of the plurality of vertical sensing capacitors 22 are equal, or errors are avoided as much as possible to achieve equality. Capacitance values of the plurality of horizontal sensing capacitors 21 are equal, or errors are reduced as much as possible to achieve equality.

The present disclosure is described in detail in accordance with the above contents with the specific preferred examples. However, this present disclosure is not limited to the specific examples. For the ordinary technical personnel of the technical field of the present disclosure, on the premise of keeping the conception of the present disclosure, the technical personnel can also make simple deductions or replacements, and all of which should be considered to belong to the protection scope of the present disclosure.

What is claimed is:

1. A touch panel comprising:
   a substrate;
   a plurality of capacitive sensor units, the plurality of capacitive sensor units being disposed on the substrate and distributed in an array of M rows and N columns, each of the capacitive sensor units comprising a first sensing capacitor and a second sensing capacitor disposed adjacent to each other; wherein the capacitive sensor unit comprises an emitting electrode, the first receiving electrode, and a second receiving electrode, the emitting electrode comprises a first emitting metal segment and a second emitting metal segment connected to each other and having a predetermined angle, the first receiving electrode has a width identical to a width of the first emitting metal segment, the first receiving electrode is in parallel with and faces the first emitting metal segment to constitute the first sensing capacitor, the second receiving electrode is in parallel with and faces the second emitting metal segment to constitute the second sensing capacitor;
   an emitting signal line, the emitting signal line being connected to one terminal of each of the first sensing capacitors and one terminal of each of the second sensing capacitors;
   N first receiving signal lines, the N first receiving signal lines being respectively connected to another terminals of the first sensing capacitors of the capacitive sensor units in the N columns, the first sensing capacitors in a same column corresponding to one first receiving signal line; and
   M second receiving signal lines, the M second receiving signal lines being respectively connected to another terminals of the second sensing capacitors of the capacitive sensor units in the M rows, the second sensing capacitors in a same row corresponding to one second receiving signal line;
   wherein the touch panel further comprises a touch sensor chip, the touch sensor chip has N first receiving pins and M second receiving pins, the N first receiving pins are connected to the N first receiving signal lines correspondingly, the M second receiving pins are connected to the M second receiving signal lines correspondingly;
   the first sensing capacitor comprises the first receiving electrode and the first emitting electrode, the first receiving electrode is connected to the first receiving signal line correspondingly, the first emitting electrode is connected to the emitting signal line.

2. The touch panel as claimed in claim 1, wherein second receiving electrode is connected to the second receiving signal line correspondingly, the second emitting electrode is connected to the emitting signal line.

3. The touch panel as claimed in claim 1, wherein the first receiving signal line monitors capacitance changes of the first sensing capacitors of a corresponding column, the second receiving signal line monitors capacitance changes of the second sensing capacitors of a corresponding row, and a capacitance variation of each of the second sensing capacitors and the first sensing capacitors is calculated and obtained based on an inversion reconstruction algorithm.

4. The touch panel as claimed in claim 1, wherein capacitance values of the plurality of first sensing capacitors are equal, capacitance values of the plurality of second sensing capacitors are equal.

5. The touch panel as claimed in claim 1, wherein the first emitting metal segment and the second emitting metal segment are vertically connected.

6. The touch panel as claimed in claim 1, wherein the first emitting metal segment and the second emitting metal segment are connected at an angle of 45 degrees.

7. A touch panel comprising:
   a substrate;
   a plurality of capacitive sensor units, the plurality of capacitive sensor units being disposed on the substrate and distributed in an array of M rows and N columns, each of the capacitive sensor units comprising a first sensing capacitor and a second sensing capacitor disposed adjacent to each other, wherein the capacitive sensor unit comprises an emitting electrode, the first receiving electrode, and a second receiving electrode, the emitting electrode comprises a first emitting metal segment and a second emitting metal segment connected to each other and having a predetermined angle, the first receiving electrode has a width identical to a width of the first emitting metal segment, the first receiving electrode is in parallel with and faces the first emitting metal segment to constitute the first sensing capacitor, the second receiving electrode is in parallel with and faces the second emitting metal segment to constitute the second sensing capacitor;
   an emitting signal line, the emitting signal line being connected to one terminal of each of the first sensing capacitors and one terminal of each of the horizontal second sensing capacitors;
   N first receiving signal lines, the N first receiving signal lines being respectively connected to another terminals of the first sensing capacitors of the capacitive sensor units in the N columns, the first sensing capacitors in a same column corresponding to one first receiving signal line; and
   M second receiving signal lines, the M second receiving signal lines being respectively connected to another terminals of the second sensing capacitors of the capacitive sensor units in the M rows, the second sensing capacitors in a same row corresponding to one second receiving signal line.

8. The touch panel as claimed in claim 7, wherein the touch panel further comprises a touch sensor chip, the touch sensor chip has N first receiving pins and M second receiving pins, the N first receiving pins are connected to the N first receiving signal lines correspondingly, the M second receiving pins are connected to the M second receiving signal lines correspondingly.

9. The touch panel as claimed in claim 7, wherein the first receiving electrode is connected to the first receiving signal line correspondingly, the first emitting electrode is connected to the emitting signal line.

10. The touch panel as claimed in claim 7, wherein the second receiving electrode is connected to the second receiving signal line correspondingly, the second emitting electrode is connected to the emitting signal line.

11. The touch panel as claimed in claim 7, wherein the first receiving signal line monitors capacitance changes of the first sensing capacitors of a corresponding column, the second receiving signal line monitors capacitance changes of the second sensing capacitors of a corresponding row, and a capacitance variation of each of the second sensing capacitors and the first sensing capacitors is calculated and obtained based on an inversion reconstruction algorithm.

12. The touch panel as claimed in claim 7, wherein capacitance values of the plurality of first sensing capacitors are equal, capacitance values of the plurality of second sensing capacitors are equal.

13. The touch panel as claimed in claim 7, wherein the first emitting metal segment and the second emitting metal segment are vertically connected.

14. The touch panel as claimed in claim 7, wherein the first emitting metal segment and the second emitting metal segment are connected at an angle of 45 degrees.

15. A touch display panel comprising:
a display panel; and
a touch panel disposed on the display panel, the touch panel comprising:
   a substrate;
   a plurality of capacitive sensor units, the plurality of capacitive sensor units being disposed on the substrate and distributed in an array of M rows and N columns, each of the capacitive sensor units comprising a first sensing capacitor and a second sensing capacitor disposed adjacent to each other, wherein the capacitive sensor unit comprises an emitting electrode, the first receiving electrode, and a second receiving electrode, the emitting electrode comprises a first emitting metal segment and a second emitting metal segment connected to each other and having a predetermined angle the first receiving electrode has a width identical to a width of the first emitting metal segment the first receiving electrode is in parallel with and faces the first emitting metal segment to constitute the first sensing capacitor, the second receiving electrode is in parallel with and faces the second emitting metal segment to constitute the second sensing capacitor;
   an emitting signal line, the emitting signal line being connected to one terminal of each of the first sensing capacitors and one terminal of each of the second sensing capacitors;
   N first receiving signal lines, the N first receiving signal lines being respectively connected to another terminals of the first sensing capacitors of the capacitive sensor units in the N columns, the first, sensing capacitors in a same column corresponding to one first receiving signal line; and
   M second receiving signal lines; the M second receiving signal lines being respectively connected to another terminals of the second, sensing capacitors of the capacitive sensor units in the M rows, the second sensing capacitors in a same row corresponding to one second receiving signal line.

16. The touch display panel as claimed in claim 15, wherein the touch panel further comprises a touch sensor chip, the touch sensor chip has N first receiving pins and M second receiving pins, the N first receiving pins are connected to the N first receiving signal lines correspondingly, the M second receiving pins are connected to the M second receiving signal lines correspondingly.

17. The touch display panel as claimed in claim 15, wherein the first receiving electrode is connected to the first receiving signal line correspondingly, the first emitting electrode is connected to the emitting signal line.

18. The touch display panel as claimed in claim 15, wherein the second receiving electrode is connected to the second receiving signal line correspondingly, the second emitting electrode is connected to the emitting signal line.

* * * * *